Figure 1:
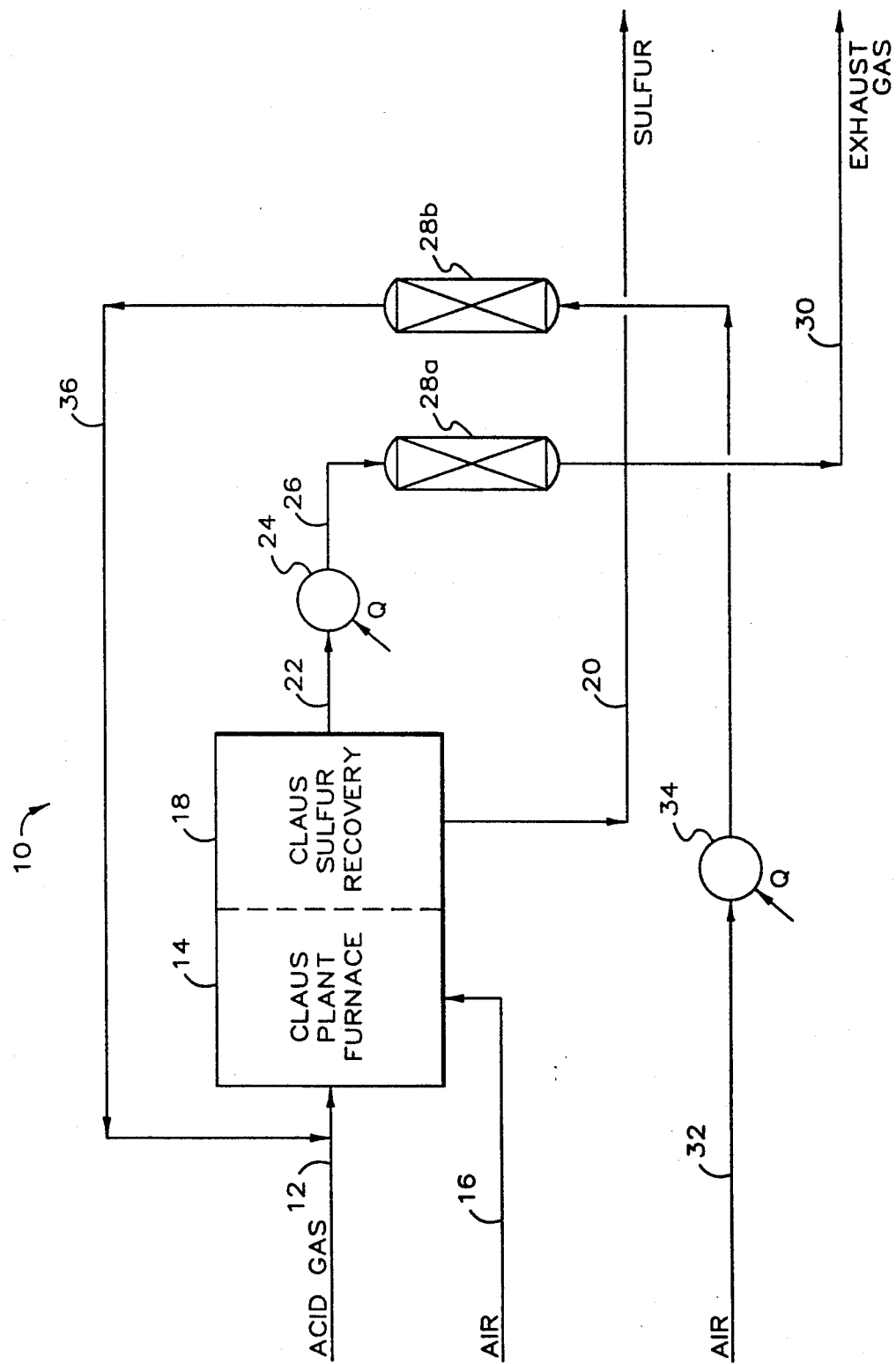

United States Patent
Lowery et al.

[11] Patent Number: 5,219,542
[45] Date of Patent: Jun. 15, 1993

[54] PROCESS FOR REMOVING SULFUR COMPOUNDS

[75] Inventors: Richard E. Lowery, Muscatine, Iowa; Donald R. Engelbert, Copan, Okla.

[73] Assignee: Phillips Petroleum Company, Bartlesville, Okla.

[21] Appl. No.: 727,780

[22] Filed: Jul. 10, 1991

[51] Int. Cl.$^5$ .............. C01B 17/16; C01B 31/20; C01B 17/20; B01J 8/00
[52] U.S. Cl. ................. 423/230; 423/243.01; 423/244.01; 423/245.1
[58] Field of Search ............. 423/244 R, 242 R, 230, 423/245.1

[56] References Cited

U.S. PATENT DOCUMENTS

| | | | |
|---|---|---|---|
| 2,378,689 | 6/1945 | Collins | 423/230 |
| 2,930,673 | 3/1960 | Block et al. | 23/3 |
| 4,044,114 | 8/1977 | Dezael et al. | 423/574 |
| 4,088,736 | 5/1978 | Courty et al. | 423/230 |
| 4,371,507 | 2/1983 | Farha et al. | 423/230 |
| 4,533,529 | 8/1985 | Lee | 423/230 |
| 4,797,268 | 1/1989 | McGovern et al. | 423/574 |
| 4,990,318 | 2/1991 | Kidd | 423/230 |

Primary Examiner—Gregory A. Heller
Attorney, Agent, or Firm—Charles W. Stewart

[57] ABSTRACT

A novel composition comprising zinc oxide, zinc phosphate and, optionally, alumina is described which can effectively be used to remove sulfur compounds from a fluid stream by contacting said fluid stream under suitable absorption conditions with the novel composition. A novel method of producing an absorption composition is described where the steps include the formation of a composition comprising zinc oxide, zinc phosphate and, optionally, alumina.

15 Claims, 1 Drawing Sheet

PROCESS FOR REMOVING SULFUR COMPOUNDS

This invention relates to a process for removing sulfur or sulfur compounds from fluid streams. In another aspect, this invention relates to a method for making a composition and the composition thereof suitable for use in a process for removing sulfur compounds from fluid streams.

The removal of sulfur from fluid streams can be desirable or necessary for a variety of reasons. If the fluid stream is to be released as a waste stream, removal of sulfur from the fluid stream can be necessary to meet any sulfur emission requirements that may be set by various air pollution control authorities. Such sulfur emission requirements are generally in the range of from about 4 ppm to about 500 ppm, or less, of sulfur in the fluid stream. If the fluid stream is to be burned as a fuel, removal of sulfur from the fluid stream can be necessary to prevent environmental pollution. If the fluid stream is to be processed, removal of the sulfur is often necessary to prevent the poisoning of sulfur sensitive catalyst or to satisfy other process requirements.

Various solid absorption compositions have been used to remove sulfur from fluid streams when the sulfur is present as hydrogen sulfide ($H_2S$). Of those materials proposed as sulfur absorbents, many do not have the desirable properties necessary for being effective, commercially viable absorbing materials. In order for an absorbent composition to be commercially useable, it must have a high sulfur-absorption capacity and it must be capable of efficiently removing significant amounts of sulfur from fluid streams contaminated with sulfur or sulfur compounds. It has been found that many of these absorbing compositions effectively oxidize significant amounts of hydrogen sulfide to sulfur dioxide with the resulting sulfur dioxide thereafter passing unabsorbed through the contact material along with the effluent fluid stream. This phenomenon is sometimes called "sulfur slippage." It is desirable to have an absorption material that not only has a high capacity to absorb sulfur from a fluid stream, but also minimizes the amount of sulfur slippage.

Many of the prior art absorbent compositions are known to contain certain quantities of silica which has the tendency of being extremely abrasive thus causing extreme amounts of equipment wear during the agglomeration of the absorbent composition. However, silica is an important component of absorbent compositions in that it provides a support matrix for the active zinc oxide ingredients. In order to reduce equipment wear during the production of an absorbent composition agglomerate, it is necessary to reduce the amount of silica contained within the composition while still having a composition that has the desirable properties of high sulfur absorption capacity, high crush strength, and the ability to be repeatedly regenerated without the loss of certain desirable physical properties. Furthermore, the new absorbent must provide for a low sulfur slippage in absorption processes.

It is, thus, an object of this invention to provide a novel absorbent composition having the desirable properties, among others, of high sulfur absorption capacity, high crush strength and the ability to be repeatedly regenerated without the loss of certain desirable physical properties.

It is a further object of this invention to provide a process for removing sulfur or sulfur compounds from sulfur contaminated fluid streams while simultaneously minimizing the amount of sulfur slippage.

A still further object of this invention is to provide a method for producing a novel absorbent composition having desirable physical properties and wherein equipment wear that results from the manufacture of such a novel composition is significantly reduced.

Accordingly, it has been found that the novel composition comprising zinc oxide, zinc phosphate and, optionally, alumina can be effectively used to remove sulfur compounds from a fluid stream by contacting said fluid stream under suitable absorption conditions with this novel composition. One important advantage of the novel composition as described herein is that it eliminates the use of silica as a component of the composition thereby significantly reducing equipment wear which occurs during agglomeration of the absorbent composition. Also, a novel method of producing an absorption composition comprising forming a mixture comprising zinc oxide, zinc phosphate and, optionally, alumina is provided.

Other objects, advantages and features of this invention will become apparent from a study of this disclosure, the appended claims and the drawing in which:

FIG. 1 is a schematic process flow diagram illustrating a preferred embodiment of the inventive process for removing sulfur compounds from contaminated fluid streams.

The composition of matter of this invention, which is used as an absorbent for removing sulfur compounds from a fluid stream, is a novel composition comprising zinc oxide and zinc phosphate. In another embodiment of the invention, the composition of matter optionally can comprise alumina. As used herein, the term "phosphate" includes orthophosphates, pyrophosphates, metaphosphates, and polyphosphates. The zinc phosphate compounds suitable for used in the composition of matter can be represented stoichiometrically by the formula:

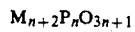

$$M_{n+2}P_nO_{3n+1}$$

wherein M is a metal atom, P is phosphorus, O is oxygen, and n is an integer number of 1 or greater.

As used herein, the terms "absorbent", "absorbent composition", "absorbent compounds", "absorbent material", "absorbent mixture", "absorption", "absorption process", "absorbed", "absorbing" and the like are utilized in a generic sense referring to the mass transfer mechanisms and the mass transfer features described in this specification which can include, but are not limited to, absorption, chemi-absorption, adsorption and combinations thereof. Because it is uncertain as to the precise physical or chemical, or both, mechanisms which occur when employing the inventive compositions and processes described herein, the above-listed terms, or any terms in similar form, are used for the sake of convenience and are not intended to limit in any way the present invention.

The composition of matter of this invention can be prepared by any suitable method which will give an absorption composition suitable for use in the contacting of sulfur contaminated fluid streams. One preferred method for preparing the absorption composition is to combine the zinc oxide, zinc phosphate, and, optionally, alumina by the use of any suitable mixing device capable of achieving a desired degree of mixing. These components can be mixed in a batch-wise fashion or a continuous fashion provided that the components are thoroughly and intimately mixed prior to further processing. Suitable types of batch mixers include, but are not limited to, change-can mixer, stationary-tank mixers, double-arm kneading mixers having any suitable type of agitator or blades such as sigma blades, dispersion blades, multi-wiping overlap blades, single curb blades, double-nabin blades and the like. Suitable types of continuous mixers can include, but are not limited to, single or double screw extruders, trough-and-screw mixers and pugmils. To achieve the desired dispersion of the absorption material components, the materials are mixed until a homogenous mixture is formed. The mixing time should be sufficient to give a uniform mixture and, generally, will be less than about 45 minutes. Preferably, the mixing time will be in the range from about 2 minutes to about 15 minutes.

Following the mixing of the components, an aqueous solution of an acid compound can advantageously be added to the mixture to form a paste of a desired consistency. The aqueous solution can be added to the mixture by any suitable method capable of providing a paste having suitable properties for agglomeration. Preferably, however, the aqueous solution is added to the mixture by spraying within the mixture during continued mixing. Any suitable aqueous solution of an acid compound can be used in the preparation of the absorbing composition. Examples of such suitable acid compounds include, but are not limited to, nitric acid, acetic acid, sulfuric acid, and hydrochloric acid. Preferably, the acid compound is selected from the group consisting of nitric acid, acetic acid, sulfuric acid and hydrochloric acid. The most preferred acids for use in this invention, however, are acetic acid and nitric acid. The concentration of the acid compound in the aqueous acid solution can range from an effective concentration up to about 25 weight percent. Preferably, the acid concentration shall range from about 0.5 to about 15 weight percent and, most preferably, the acid concentration shall range from about 0.5 to about 10 weight percent. The term "weight percent", when referring to the acid concentration of the aqueous acid solution, shall be defined as the ratio of the weight of the acid compound or solute to the weight of the total aqueous solution times a factor of 100.

Following the addition of the acid to the mixture, the paste material formed by such addition of acid undergoes an agglomeration step. The agglomeration step is utilized to enlarge the size of the absorption material particles and to form them into relatively permanent masses or agglomerates having certain desirable forms such as spheroids, pills or tablets, cylinders, irregular extrusions or merely loosely bound aggregates or clusters. Any suitable method of an agglomeration known in the art can be used. Examples of such methods include, but are not limited to, molding, tabletting, pressing, pelletizing, extruding, and tumbling. The preferred method, however, is by extrusion. Various types of extrusion methods and extrusion equipment can be used. It is preferred to use either a single screw extruder or a double screw extruder that uses a screw or auger to convey or force the paste through a die plate to produce the desirable shapes or extrusion profiles.

After the paste is agglomerated, the resulting agglomerate is then dried, preferably at a temperature generally in the range of from about 75° C. to about 300° C. and, more preferably, in the range of from about 90° C. to about 250° C., for a period of time generally in the range of from about 0.5 hour to about 4 hours and, more preferably, in the range of from about 1 hour to about 3 hours. The dried, extruded material is then calcined in the presence of oxygen or an oxygen-containing gas at a temperature suitable for achieving the desired degree of calcination, for example generally in the range of from about 375° C. to about 750° C. and, more preferably, in the range of from about 500° C. to about 700° C. The calcination step is conducted for a period of time suitable for achieving the desired degree of calcination, for example, generally in the range of from about 0.5 hour to about 4 hours and, more preferably, in the range of from about 1 hour to about 3 hours to produce the absorbing composition.

The zinc oxide used in the preparation of the absorbing composition can be either in the form of zinc oxide, or in the form of one or more zinc compounds that are convertible to zinc oxide under the conditions of preparation described herein. Examples of such zinc compounds include zinc sulfide, zinc sulfate, zinc hydroxide, zinc carbonate, zinc acetate, and zinc nitrate. Preferably, the zinc oxide is in the form of powdered zinc oxide.

Generally, zinc oxide is the primary active component of the absorption composition, and it will be present in the composition in an amount suitable for providing the desired absorption capacity. Generally, the zinc oxide can be present in the absorption composition at a concentration that is effective for producing a desired absorption capacity, for example, at about 40 weight percent, to about 95 weight percent. Preferably, the zinc oxide can be present in the range of from about 60 to about 90 weight percent. Most preferably, the zinc oxide can be present in the absorption composition in the range of from about 70 to about 90 weight percent. As used herein, the term "weight percent," when referring to the components of the absorption composition, is defined as parts by weight of the given component per 100 parts by weight of the total combined weight of zinc oxide, zinc phosphate, and alumina.

The zinc phosphate component of the composition of matter of this invention is used as a support matrix material for the primary active zinc oxide component. It is desirable to have any concentration of the zinc phosphate material in the composition that is effective for producing an absorbent composition having the important physical properties of high absorption capacity, high crush strength, and the ability to be repeatedly regenerated without the loss of certain important physical properties. It is also important for the composition to have the property of providing for low sulfur slippage when utilized in a sulfur absorption process. An additional benefit provided by the zinc phosphate component of this invention is that it replaces highly abrasive components of the prior art absorbent compositions, such as, for example, silica, as a support matrix thereby significantly reducing equipment wear during the manufacture of the composition. Consequently, an effective concentration of zinc phosphate in the composition of matter of this invention is desirable with the concentration preferably being in the range of from about 10 to about 40 weight percent. Most preferably, the concentration of zinc phosphate will range from about 10 to about 30 weight percent.

While the zinc phosphate is the primary material for use as a support matrix for the active zinc oxide component of the composition, the compound alumina can also be used as an additional optional support matrix material in any suitable advantageous concentration. Preferably, the alumina should be present in an amount up to about 30 weight percent. Most preferably, however, the alumina should be present up to about 20 weight percent.

In the mixing of the components, an aqueous solution of an acid compound, as earlier described herein, can also be mixed with the components to help form a paste suitable for agglomeration. The quantity of aqueous solution present in the absorption composition can preferably be between about 5 and about 30 parts by weight per 100 parts by weight of the sum weight of the zinc oxide, zinc phosphate, and alumina. More preferably, however, the aqueous solution will be present in the absorption composition in the amount in the range of from about 15 to about 25 parts by weight per 100 parts by weight of the sum weight of the zinc oxide, zinc phosphate, and alumina.

The paste formed can be agglomerated by any method known in the art, as earlier described herein; but, preferably, the paste can be extruded to form an extrudate. The agglomerated material can then optionally be dried at a temperature generally in the range of from about 75° C. to about 300° C. and, more preferably, in the range of from 90° C. to 250° C. The optional drying step can be performed during a time period generally in the range of from about 0.5 hour to about 4 hours and, more preferably, in the range of from about 1 hour to 3 hours. The dried agglomerate can then be calcined in the presence of an oxygen-containing gas at a temperature generally in the range of from about 375° C. to about 750° C. and, more preferably, in the range of from 500° C. to 700° C. The calcining step is conducted for a period of time generally in the range of from about 0.5 hour to about 4 hours and, more preferably, in the range of from about 1 hour to about 3 hours to produce the absorbing composition employed in the process of the present invention.

The composition of matter of this invention can have any suitable desirable physical properties required for having an effective absorbent composition. In general, the sulfur loading capacity of the composition of matter will range upwardly to about 20 weight percent, or greater. The sulfur loading capacity of the absorbent composition is defined as the ratio of the mass of the absorbed sulfur upon the surface of the composition to the total mass of the composition multiplied by a factor of 100. Preferably, the sulfur loading capacity of the absorbent composition shall be greater than about 5 weight percent, most preferably, however, the sulfur loading capacity of the absorbent composition will range from about 8 to about 20 weight percent.

The pore volume of the composition of matter of this invention is generally any suitable pore volume which permits the desirable sulfur absorption from a sulfur contaminated fluid stream. Generally, the pore volume will range from about 0.1 milliliter (mL) per gram to about 0.4 mL per gram. Most preferably, however, the pore volume shall range from about 0.1 to about 0.3 mL per gram. The pore volume as reported herein is measured by the method of mercury intrusion porosimetry as reported in detail in ASTM D 4284-88 entitled "Standard Test Method for Determining Pore Volume Distribution of Catalysts by Mercury Intrusion Porosimetry." The standard ASTM test designated as D 4284-88 is incorporated herein by reference.

It is desirable to have an absorbent composition having a high crush strength in order to permit the use of the absorbent composition in severe operating conditions and in order to increase the effective commercial life of the absorbent composition. Generally, it is desirable to have an absorbent composition with a crush strength greater than about 3 pounds force ($lb_f$). Preferably, the crush strength of the absorbent composition should range from about 3 $lb_f$ to about 15 $lb_f$. The crush strength of the absorbent particles are determined by standard ASTM Method D 4179-88A entitled "Standard Test Method for Single Pellet Crush Strength of Formed Catalyst Shapes." The standard test method ASTM D 4179-88A is incorporated herein by reference.

It can further be desirable to add a metal promoter to the absorbent composition of this invention. It has been found that certain metal promoters are useful in assisting in the regeneration of a spent absorbent composition by lowering the necessary temperature for regeneration. Further benefits that can accrue from the utilization of a metal promoter is that the incorporation of such metal promoter onto the absorbent composition can have the positive effect of increasing its ultimate crush strength. Additionally, a metal promoter can have the ability to hydrogenate sulfur oxide species to hydrogen sulfide when employed in a hydrogen sulfide absorption process. Therefore, the absorbent composition of this invention can be promoted with any suitable metal promoter, which is generally a metal oxide compound. Preferred promoters include, but are not limited to, metals selected from the group consisting of phosphorus, tungsten, molybdenum, Group VIII metals of the Periodic Table, and mixtures of two or more thereof. The most preferred promoter is nickel. The promoters and promoter metals can be added to the absorbing composition either in their elemental form or in the form of suitable metal oxides.

Molybdenum compounds suitable for use as a promoter metal are ammonium molybdate, potassium molybdate, molybdenum oxides such as molybdenum (IV) oxide and molybdenum (VI) oxide and the like and mixtures of any two or more thereof.

Tungsten compounds suitable for use as a promoter metal are ammonium tungstate, potassium tungstate, tungsten oxides such as tungsten (IV) oxide and tungsten (VI) oxide and the like and mixtures of any two or more thereof.

Other metal compounds suitable for use as a promoter metal are metal acetates, metal carbonates, metal nitrates, metal oxides, metal sulfates, metal thiocyanates, and the like, and mixtures of any two or more thereof, wherein the metals are selected from Group VIII of the Periodic Table.

The promoters or promoter metals, or both, can be added to the absorbing composition by any method known in the art. One preferred method for impregnating the absorbing composition with a promoter is by a standard incipient wetness procedure whereby the absorbent composition is impregnated with either an aqueous or an organic solution containing the desirable amount of promoter that has been diluted with a volume of the aqueous or organic solvent that is equal to the total pore volume of the absorbent material being impregnated. After the promoter has been added to the absorbent material, it is dried to remove essentially all of the solvent. The dried, promoter impregnated absorbent material can optionally be calcined in the presence of oxygen or an oxygen-containing gas at a temperature in the range of from about 500° C. to about 650° C. until volatile matter is removed and the promoting elements are substantially converted to their oxides. The time required for calcining step can range from about 0.1 to about 10 hours.

The sulfur removal processes of the present invention can be carried out by means of any apparatus whereby there is achieved an alternate contact of the absorbing composition with the sulfur-containing gaseous feed stream and, thereafter, of the absorbing composition with oxygen or an oxygen-containing gas which is utilized to regenerate the absorbing composition. The sulfur removal process is in no way limited to the use of a particular apparatus. The sulfur removal process of this invention can be carried out using a fixed bed of absorbing composition, a fluidized bed of absorbing composition, or a moving bed of absorbing composition. Presently preferred is a fixed bed of absorbing composition.

In order to avoid any casual mixing of the gaseous feed stream containing hydrogen sulfide with the oxygen-containing gas utilized in the regeneration step, provision is preferably made for terminating the flow of the gaseous feed stream to the reactor and subsequently injecting an inert purging fluid such as nitrogen, carbon dioxide or steam. Any suitable purge time can be utilized but the purge should be continued until all hydrocarbon and/or hydrogen sulfide are removed. Any suitable flow rate of the purge fluid can be utilized. A presently preferred purge fluid flow rate is one which will give a gaseous hourly space velocity (GHSV) in the range of from about 800 GHSV to about 1200 GHSV. As used herein, the term "gaseous hourly space velocity" is defined as the ratio of the gaseous volumetric flow rate at standard conditions of 15.6° C. and one atmosphere of pressure to the reactor volume.

The composition of matter of this invention can be utilized to remove trace quantities of sulfur compounds from any suitable type of gaseous effluent stream containing contaminating quantities of sulfur compounds. Such gaseous streams can contain sulfur compounds in the concentration range upwardly to about 2 weight percent. The sulfur compounds are generally of the type consisting of hydrogen sulfide, sulfur dioxide, carbonyl sulfide, carbon disulfide, and mixtures of two or more thereof. One preferred embodiment of the invention includes the processing of Claus plant tail gas streams. Of these Claus plant tail gas streams, they can be from either a Claus process operated in a mode for minimizing sulfur dioxide or the tail gas stream can undergo a prior hydrogenation step whereby the sulfur compounds within the tail gas stream are reduced to hydrogen sulfide. The sulfur dioxide minimization operation mode of the Claus process is conducted by providing the reaction zone with a slight excess of hydrogen sulfide above the stoichiometric requirement for the Claus reaction. This slight stoichiometric excess of hydrogen sulfide results in minimizing the amount of sulfur dioxide that is present in a Claus tail gas. If the ratio of hydrogen sulfide to sulfur dioxide in the reaction zone of a Claus plant approximates 2:1, then the ratio of hydrogen sulfide to sulfur dioxide in the Claus tail gas will also approximate 2:1. Generally, the concentration of sulfur compounds in a Claus tail gas stream will be less than 2 mol percent; the carbon dioxide will be present in the tail gas stream at a concentration in the range of from about 5 to about 60 mol percent. Water normally will be present in the range of from about 10 mol percent to about 40 mol percent, nitrogen will be present in the range of from about 20 mol percent to about 50 mol percent and hydrogen will be present in the range upwardly to about 2 mol percent.

The gaseous stream containing a concentration of sulfur compounds is contacted with the novel absorption composition to produce a treated effluent stream having a substantially reduced concentration of sulfur compounds. Preferably, the substantially reduced concentration of the sulfur compounds in the treated effluent stream can be less than 0.5 mol percent of the treated effluent stream. Most preferably, the substantially reduced concentration of sulfur compounds in the treated effluent stream can be less than 0.02 mol percent of the treated effluent stream.

Any suitable temperature for the sulfur-removal processes of the present invention can be utilized which will achieve the desired removal of sulfur from a gaseous feed stream. The temperature will generally be in the range of from about 150° C. to about 600° C. and will, more preferably, be in the range of from about 200° C. to about 450° C.

Any suitable temperature can be utilized which will regenerate the absorbing composition from its sulfided form back to the original absorbing composition form. The regeneration temperature will generally be in the range of from about 370° C. to about 815° C. The regeneration temperature is preferably in the range of from about 425° C. to about 750° C. Most preferably, the regeneration temperature should range from about 425° C. to about 700° C.

Any suitable pressure can be utilized for the processes of the present invention. The pressure of the gaseous feed stream being treated is not believed to have an important effect on the absorption process of the present invention, and will generally be in the range of from about atmospheric to about 2,000 psig during the treatment.

Any suitable residence time for the sulfur-containing gaseous feed stream in the presence of the absorbing composition of the present invention can be utilized. The residence time expressed as volumes of gas at standard temperature and pressure per volume of absorbing composition per hour will generally be in the range of about 10 to about 10,000 and will, more preferably, be in the range of about 250 to about 2500.

In the preferred embodiment of the invention, the Claus plant effluent stream having a concentration of sulfur compounds can be introduced into an absorption zone containing the novel absorbent composition to remove at least a portion of the concentration of sulfur compounds to produce a treated effluent stream having a substantially reduced concentration of the sulfur compounds to produce a laden absorbent composition. Periodically, the laden absorbent composition can be regenerated by passing an oxygen-containing gas in contact with the laden absorbent composition to a regenerated absorbent and a regeneration effluent stream. Claus processes are well known in the art and any references herein to Claus processes or Claus plants refers to those conversion processes for recovering elemental sulfur from fluid streams, sometimes referred to as acid gas streams, containing primarily hydrogen sulfide and carbon dioxide. These acid gas streams are generally fluid streams having their origin from a main gas treating system used to remove hydrogen sulfide and carbon dioxide from fluid streams containing such. The acid gas stream is charged to the thermal zone of a Claus plant wherein a portion of the hydrogen sulfide is combusted in the presence of air. In the thermal zone of the Claus plant, the hydrogen sulfide will generally react with oxygen to form sulfur dioxide and water by the following reaction equation:

$$2H_2S + 3O_2 \rightarrow 2SO_2 + 2H_2O.$$

In order to convert the sulfur compounds contained in the acid gas stream to elemental sulfur, the effluent from the Claus plant thermal zone will pass to a Claus plant sulfur recovery zone or reaction zone wherein the sulfur dioxide is reacted with the unconverted hydrogen sulfide to form elemental sulfur and water in accordance with the following equation:

$$2H_2S + SO_2 \rightarrow 3S + 2H_2O.$$

For the optimum recovery of sulfur from the hydrogen sulfide in the acid gas stream, it is most desirable to maintain a ratio of hydrogen sulfide to sulfur dioxide in the fluid stream to the Claus reactor zone of about 2:1. In order to achieve this optimum ratio, the amount of air charged to the Claus plant thermal zone will be controlled so as to react a sufficient amount of $H_2S$ with oxygen to form the necessary ratio of $SO_2$. The Claus plant effluent stream or tail gas will generally have only trace quantities of sulfur compounds which include hydrogen sulfide and sulfur dioxide. Other possible sulfur compounds contained within the tail gas stream can include carbon disulfide and carbonyl sulfide. As earlier described, the Claus process can be operated in a sulfur dioxide minimization mode or, alternatively, the tail gas can further undergo a hydrogenation step whereby sulfur compounds are reduced to hydrogen sulfide prior to downstream processing. Preferably, the concentration of sulfur compounds can be less than about 2 mol percent of the tail gas stream.

The Claus plant effluent stream or tail gas stream having a concentration of sulfur compounds is introduced into a vessel defining an absorption zone containing an absorbent composition comprising zinc oxide and zinc phosphate. Optionally, the absorption compound can also contain alumina. It is preferred that the absorption compound contained within the vessel be the composition of matter of this invention. Within the absorption zone, at least a portion of the concentration of the sulfur compound contained within the tail gas stream is removed to produce a treated effluent stream having a substantially reduced concentration of the sulfur compounds, but, preferably having a concentration of sulfur compounds of less than about 0.5 mol percent and, most preferably, less than about 0.1 mol percent. The removed sulfur compounds will be absorbed upon the surfaces and within the pores of the absorbent composition to produce a laden absorbent composition. The chemical changes that are believed to occur in the absorption composition during the absorption or removal step are summarized in the following equation:

$$ZnO + H_2S \rightarrow ZnS + H_2O.$$

Once the absorbent composition becomes substantially completely sulfided, it is a laden absorbent requiring a regeneration in order to restore the composition to its original form. The regeneration is conducted periodically by terminating the fluid flow to the absorption zone followed by passing an oxygen-containing gas in contact with the laden absorbent to produce a regenerated absorbent in a regeneration effluent stream. It is believed that the regeneration step occurs by the following equation:

$$ZnS + O_2 \rightarrow ZnO + SO_x.$$

The regeneration effluent stream which contains the sulfur oxide compounds can, optionally, be recycled to be mixed with the acid gas stream being charged to the Claus plant thermal zone. This regeneration effluent stream is mixed with the acid gas stream prior to introducing the acid gas stream into the Claus plant thermal zone. The benefit from recycling the regeneration effluent stream comes from the ability to use the sulfur oxide compound as a reactant with the unconverted $H_2S$ to form elemental sulfur and water in accordance with the above equation.

Referring now to FIG. 1, there is provided a schematic representation of process 10 for removing sulfur compounds from contaminated fluid streams. An acid gas stream having a concentration of hydrogen sulfide is introduced via conduit 12 to furnace 14, which defines a thermal zone of a Claus plant, wherein at least a portion of the hydrogen sulfide of the acid gas stream is combusted with oxygen that is contained within the air that is introduced into the thermal zone defined by furnace 14 via conduit 16. The resultant product from the thermal zone is introduced into reactor 18, which defines a reactor zone of the Claus plant, wherein elemental sulfur is recovered through conduit 20, and a Claus effluent stream is produced and passes by way of conduit 22 to heating means or heat exchanger 24. The Claus plant effluent stream is, optionally, heated to a desired temperature and then passes by way of conduit 26 to absorber vessels 28a and 28b, which respectively define two separate absorption zones. Contained within the absorption zones is the novel absorbent composition, as described herein, comprising zinc oxide and zinc phosphate. Optionally, the absorption composition can contain alumina. Within the absorption zones, at least a portion of the sulfur compounds contained within the Claus plant effluent stream are absorbed by the absorbent composition or removed from the effluent stream to produce a treated effluent stream which is conveyed from absorber vessel 28a or 28b, or both, via conduit 30. The treated effluent stream will generally have a substantial reduction in the concentration of the sulfur compounds. Preferably, the amount of sulfur compounds contained within the treated effluent stream will be less than about 0.5 mol percent and, most preferably, the concentration of sulfur compounds in the treated effluent stream will be less than 0.1 mol percent.

It is generally desirable to have at least two separate absorption zones in order to permit the simultaneous regeneration of one absorption zone while utilizing another absorption zone for removing or absorbing sulfur compounds from the Claus plant tail gas stream. Having at least two absorbent zones permits the periodic regeneration of a laden absorbent composition by passing an oxygen-containing gas, such as air, in contact with the ladened absorbent to produce a regenerated absorbent and a regeneration effluent stream. The oxygen-containing gas is introduced into absorber vessel 28a or 28b, or both, via conduit 32. Optionally, disposed within conduit 32 is heating means or heat exchanger 34 which, if desired, permits the heating of the oxygen-containing gas prior to passing the gas into at least one of the absorption zones. The regeneration effluent stream passes from absorber vessel 28a or 28b, or both, through conduit 36 to be mixed with the incoming acid gas stream passing through conduit 12 prior to introducing the thus formed mixture to the thermal zone.

EXAMPLE I

This calculated Example I provides calculated ranges and a specific calculated example for the various operating conditions, process flows and compositions in the operation of one embodiment of the herein-described invention.

TABLE I

Typical Operating Conditions, Flows and Compositions (Calculated)

| | Range |
|---|---|
| Acid Gas Feed Stream (12) | |
| Composition (mol percent on dry basis) | |
| Hydrogen Sulfide | 10–98 |
| Carbon Dioxide | 0–90 |
| Carbon Sulfide | 0–2 |
| Hydrocarbon | 0–2 |
| Air Stream | 1:1 to 2:1 |
| Ratio of Oxygen-to-Hydrogen Sulfide | preferably 0.5:1 |
| Thermal Zone (14) | |
| Operating Conditions | |
| Temperature (°C.) | 760–1260 |
| Pressure (psig) | 5–30 |
| Reaction Zone (18) | |
| Operating Conditions | |
| Temperature (°C.) | 150–400 |
| Pressure (psig) | 5–30 |
| Claus Plant Effluent Stream (22) | |
| Composition (mol percent) | |
| Sulfur Compounds | less than 2 |
| Water | 10–40 |
| Hydrogen | 0–2 |
| Nitrogen | 20–50 |
| Carbon Dioxide | 5–60 |
| Total Effluent Stream (30) | 0.1–0.5 |
| Composition (mol percent): | |
| Sulfur Compounds | |
| Regeneration Effluent Stream (36) | |
| Composition (mol percent): | |
| Sulfur Oxides | 5–25 |
| Nitrogen | 70–90 |
| Water | 1–5 |

EXAMPLE II

This Example II describes the method of preparing the absorbent compositions along with the components of such compositions and pertinent physical property data of the prepared compositions.

The solid compounds of zinc oxide and either zinc phosphate or calcium phosphate were dry mixed for a period of about 3 minutes prior to mulling the compounds. The mulling solution, which consisted of a 2 weight percent aqueous solution of an acid compound of either acetic acid or nitric acid, was added to the solid mixture whereafter the resulting mixture was mulled to provide a material having a desired consistency for extrusion. The material was extruded to form an extrudate followed by drying at about 200° C. in a convection oven for a period of about 2 hours. The dried extrudate was then calcined at a temperature of about 675° C. for a period of about 3 hours to produce a calcined extrudate.

Presented in Table II are the sample compositions prepared by the above-described method listing the amount of materials added to each composition along with the crush strength and pore volume of the resulting calcined compounds. As is shown by the data of Table II, the compositions have the desirable physical properties of high crush strength, which is in a range greater than about 1 lb$_f$, and high pore volume, which is in a range greater than about 0.18 cc/gm.

TABLE II

| Sample | ZnO (gm) | Zinc Phosphate (gm) | Calcium Phosphate (gm) | Acetic Acid H$_2$O (mL) | Nitric Acid H$_2$O (mL) | Crush Strength (lb$_f$) | Pore Volume (cc/gm) |
|---|---|---|---|---|---|---|---|
| 1 | 360 | 40 | — | 65 | — | 7.0 | .180 |
| 2 | 320 | 80 | — | 70 | — | 3.2 | .217 |
| 3 | 280 | 120 | — | 65 | — | 2.2 | .223 |
| 4 | 240 | 160 | — | 70 | — | 1.0 | .205 |
| 5 | 360 | — | 40 | 65 | — | 11.4 | .153 |
| 6 | 320 | — | 80 | 60 | — | 9.2 | .151 |
| 7 | 280 | — | 120 | 60 | — | 6.4 | .112 |
| 8 | 240 | — | 160 | 60 | — | 3.7 | .157 |
| 9 | 360 | 40 | — | — | 90 | 2.2 | .209 |
| 10 | 320 | 80 | — | — | 90 | 1.8 | .259 |
| 11 | 280 | 120 | — | — | | | |
| 12 | 240 | 160 | | | | | |
| 13 | 360 | — | 40 | — | 90 | 6.3 | .218 |
| 14 | 320 | — | 80 | — | 80 | 5.5 | .200 |
| 15 | 280 | — | 120 | — | 80 | 3.9 | .199 |
| 16 | 240 | — | 160 | — | 80 | 2.7 | .203 |

EXAMPLE III

This Example III describes the experimental procedure used for determining the absorbent composition, sulfur loading capacity and its efficiency of use in an absorption process. The results are presented as a function of the amount of sulfur dioxide, measured in ppm, present in the effluent gaseous stream at a point in time 10 minutes into an absorption cycle, and of the total amount of sulfur absorbed by the absorption composition, measured on a weight basis, at the time of the hydrogen sulfide breakthrough.

The tests were carried out in a single reactor unit comprising a 20 mm O.D. Quartz reactor and a 2 mm thermocouple well. The reactor, which was maintained at a pressure of about 1.7 psig, was operated in a fixed bed down flow mode using 10 grams of sorbent. Within the reactor, the sorbent was heated to the reaction temperature in a stream of nitrogen. When the desired temperature was attained, the nitrogen flow was stopped, and the simulated sulfur plant gas and water vapor flows (the water content was about 12% of the gaseous stream) were started. The water vapor was generated by pumping water through a heated line within the reactor. The reaction was carried out at a reaction temperature of about 425° C. and a gas hourly space velocity of 2500 cc/cc catalyst/hour. The composition of the simulated sulfur plant gas was as follows: 4.35 volume percent hydrogen sulfide, 39.9 volume percent carbon dioxide, and 55.75 volume percent nitrogen.

The progress of the absorption was followed by measuring the concentration of hydrogen sulfide and/or the sulfur dioxide in the reactor effluent after the water vapor had been condensed and removed from the effluent. The concentration of hydrogen sulfide and/or sulfur dioxide was measured with Draeger tubes that were suited to the concentration ranges encountered.

Once the sorbents became fully sulfided, as evidenced by hydrogen sulfide breakthrough, the flow of the simulated sulfur plant gas to the reactor was halted and the reactor was purged with nitrogen for a period of about 20 minutes. The sulfided sorbent was then regenerated in the presence of air for about 1.5 hours at a regeneration temperature in the range of about 621° C. to about 675° C. Following regeneration, the reactor was again purged with nitrogen for about 40 minutes while being cooled back down to the reaction temperature of about 425° C. The nitrogen purge was then halted and the simulated sulfur plant gas was fed to the reactor to begin another absorption cycle.

The test results are summarized in the following Tables III and IV.

TABLE III

Sulfur Loading Capacity in Terms of Weight Percent for a Zinc Oxide and Zinc Phosphate Absorbent Composition

| | Acetic Acid as Binder | | Nitric Acid as a Binder | |
|---|---|---|---|---|
| Cycle # | 10 Wt % Zinc Phosphate | 20 Wt % Zinc Phosphate | 10 Wt % Zinc Phosphate | 20 Wt % Zinc Phosphate |
| 1 | 15 | 17 | 18 | 18 |
| 10 | 12 | 12 | 17 | 13 |
| 20 | 12 | 9 | 16 | 11 |
| 30 | 8 | 8 | 12 | 10 |
| 40 | 8 | | 12 | 8 |
| 50 | 10 | | 7 | |

TABLE IV

Sulfur Loading Capacity and Sulfur Slippage from Use of an Absorbent Composition Comprising 80 Percent Zinc Oxide and 20 Percent Zinc Phosphate

| Cycle # | $SO_2$ Slippage (ppm) | $H_2S$ Absorption |
|---|---|---|
| 1 | 105 | 17.1 |
| 12 | 85 | 12.9 |
| 13 | 65 | 12.9 |
| 17 | 80 | 11.5 |
| 22 | 75 | 10.5 |
| 23 | 70 | 9.8 |
| 28 | 70 | 9.1 |
| 33 | 70 | 8.4 |
| 34 | 65 | 7.7 |
| 52 | 60 | 6.1 |

The test results presented in Tables III and IV show that the novel composition has a high sulfur absorption capacity or sulfur loading capacity with the sulfur loading capacity of the composition in the range upwardly to about 18 weight percent, or greater. Additionally, the data indicate that the composition can be repeatedly regenerated without the composition losing a significant amount of its sulfur loading capacity. As the data show in Tables III and IV, the compositions can undergo as many as twenty regeneration cycles and still have a sulfur loading capacity of greater than about ten (10) weight percent. Also, the sulfur slippage data presented in Table IV show that the use of the novel composition in the inventive process provides for an exceptionally low sulfur slippage or $SO_2$ slippage with the slippage in the range of less than about 105 ppm. The data presented in this Example III show that the composition described herein has the desirable properties of high sulfur absorption capacity and the ability to be repeatedly regenerated without the loss of such desirable properties. Furthermore, the data presented in this Example III show that the composition described herein provides for a low sulfur slippage when used in the inventive process.

Reasonable variations and modifications are possible within the scope of this disclosure without departing from the scope and spirit thereof.

That which is claimed is:

1. A process for removing sulfur compounds including at least hydrogen sulfide and sulfur dioxide from a sulfur contaminated fluid stream having a concentration of said sulfur compounds comprising the step of:
    contacting said sulfur contaminated fluid stream with an absorption composition comprising:
    zinc oxide in an amount between about 60 and about 90 weight percent;
    zinc phosphate in an amount between about 10 and about 40 weight percent; and
    alumina in an amount up to about 30 weight percent to produce a treated effluent stream having a substantially reduced concentration of said sulfur compounds.

2. A process as recited in claim 1 wherein:
    said absorption composition further comprises an aqueous solution of an acid compound.

3. A process as recited in claim 2 wherein:
    said acid compound is selected from the group consisting of nitric acid, acetic acid, sulfuric acid and hydrochloric acid.

4. A process as recited in claim 3 wherein:
    the amount of said aqueous solution present in said absorption composition is between about 5 and about 30 parts by weight per 100 parts by weight of the sum weight of said zinc oxide, zinc phosphate and alumina.

5. A process as recited in claim 4 wherein:
    said absorption composition is calcined.

6. A process as recited in claim 5 wherein said concentration of said sulfur compounds in said sulfur contaminated fluid stream is in the range upwardly to about 2 weight percent and wherein said sulfur compounds further include carbonyl sulfide, carbon disulfide and mixtures of two or more of said sulfur compounds.

7. A process as recited in claim 6 wherein:
    said substantially reduced concentration of said sulfur compounds in said treated effluent stream is less than about 0.5 weight percent.

8. A process for the recovery of sulfur from a Claus plant effluent stream comprising the steps of:
    (a) introducing said Claus plant effluent stream, having a concentration of sulfur compounds including at least hydrogen sulfide and sulfur dioxide, into an absorption zone containing an absorbent composition comprising:
    zinc oxide in an amount between about 60 and about 90 weight percent;
    zinc phosphate in an amount between about 10 and about 40 weight percent; and
    alumina in an amount up to about 30 weight percent (b) removing at least a portion of said concentration of sulfur compounds to produce a treated effluent stream having a substantially reduced concentration of said sulfur compounds and to produce a laden absorbent composition; and (c) periodically regenerating said laden absorbent composition by passing an oxygen-containing gas in contact therewith to produce a regenerated absorbent and a regeneration effluent stream.

9. A process as recited in claim 8 further comprising the step of:

(d) introducing an acid gas stream having a concentration of hydrogen sulfide into a Claus unit whereby said Claus plant effluent is produced.

10. A process as recited in claim 9 further comprising the step of:

(e) mixing said regeneration effluent stream with said acid gas stream prior to introducing step (d).

11. A process as recited in claim 10 wherein: said substantially reduced concentration of said sulfur compound of said treated effluent stream is less than about 0.5 volumetric percent.

12. A process as recited in claim 11 wherein: said concentration of sulfur compounds in said Claus plant effluent stream is in the range upwardly to about 2.0 weight percent.

13. A process as recited in claim 12 wherein: step (b) is carried out at a temperature between about 600° F. and about 1000° F. and at a pressure upwardly to about 250 psia.

14. A process as recited in claim 13 wherein the flow of said Claus plant effluent stream is such to provide in step (b) a gaseous hourly space velocity between about 100 to about 10000.

15. A process as recited in claim 14 wherein: step (c) is carried out at a temperature in the range of from about 800° F. to about 1500° F.

* * * * *